United States Patent [19]

Harms et al.

[11] Patent Number: 5,249,627
[45] Date of Patent: Oct. 5, 1993

[54] METHOD FOR STIMULATING METHANE PRODUCTION FROM COAL SEAMS

[75] Inventors: Weldon M. Harms; Edith Scott, both of Duncan, Okla.

[73] Assignee: Halliburton Company, Duncan, Okla.

[21] Appl. No.: 850,729

[22] Filed: Mar. 13, 1992

[51] Int. Cl.$^5$ .................. E21B 43/12; E21B 43/267
[52] U.S. Cl. .................. 166/308; 166/281; 166/305.1
[58] Field of Search .......... 166/281, 305.1, 308, 166/312; 299/12

[56] References Cited

U.S. PATENT DOCUMENTS

| | | | |
|---|---|---|---|
| 4,471,840 | 9/1984 | Lasseter et al. | 166/308 X |
| 4,558,741 | 12/1985 | Borchardt et al. | 166/308 X |
| 4,679,630 | 7/1987 | Wyman | 166/308 X |
| 4,913,237 | 4/1990 | Kutas | 166/308 |
| 4,995,463 | 2/1991 | Kramm et al. | 166/308 |
| 5,080,170 | 1/1992 | Whitebay et al. | 166/308 X |

*Primary Examiner*—George A. Suchfield
*Attorney, Agent, or Firm*—Robert A. Kent

[57] ABSTRACT

The present invention provides a method for treating coal seams to improve dewatering to enhance gas production therefrom. The treatment is effected by contacting the coal with an effective amount of a selected additive comprises at least one member selected from the group consisting of benzyl coco di-(hydroxyethyl) quaternary amine, p-T-amyl-phenol condensed with formaldehyde and a copolymer comprising from about 80 to about 100% $C_{1-30}$ alkyl methacrylate monomers and from about 0 to about 20% hydrophilic monomers.

14 Claims, 1 Drawing Sheet

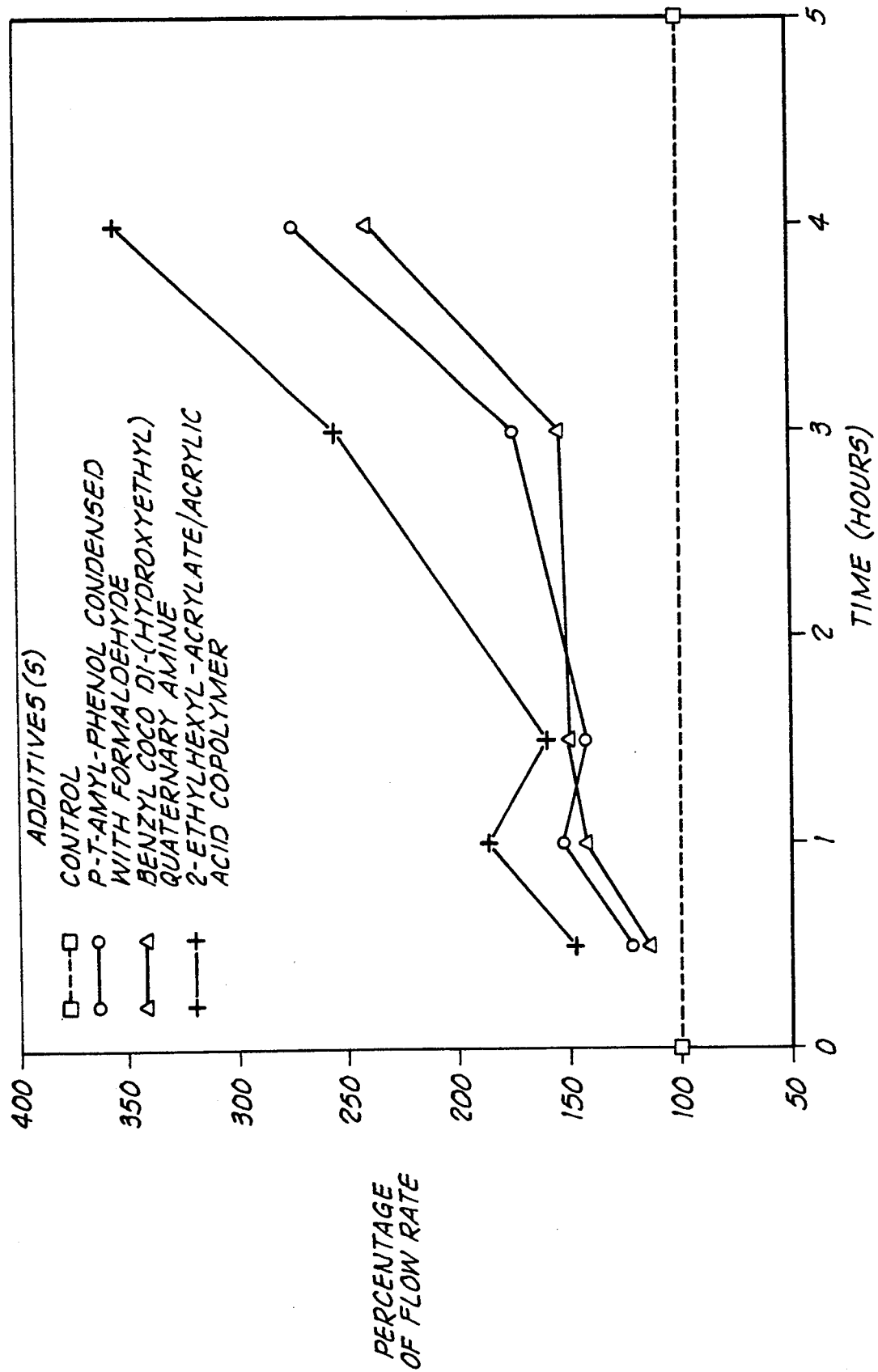

METHOD FOR STIMULATING METHANE PRODUCTION FROM COAL SEAMS

BACKGROUND OF THE INVENTION

1. Field Of The Invention

The present invention relates to a method of stimulating coal seams to improve the production of gas from the coal reservoir.

2. Prior Art

Many subterranean coal reservoirs have large volumes of both water and hydrocarbon gases, primarily methane, trapped therein. The gas found in coal is believed to have originated from the coal during its formation. The gas in the coal has been found to be adsorbed onto the internal area surface of the coal.

Presently, methane is produced from coal reservoirs through wells which are drilled into the coal seam from the surface. Once a well has been drilled and completed, the coal seam is often hydraulically fractured in much the same way as are the more conventional gas bearing formations such as sandstone or the like. Fracturing of the coal seam is believed to aid in bypassing well bore damage, distributing the pressure at or near the wellbore and accelerating the dewatering and pressure drawdown in the coal seam. The results from actual fracturing operations in coal seams indicate that the fracture mechanics and fluid flow behavior in the cleated coal formations are substantially different from those which are believed to occur in the more conventional sandstone or like formations. For a discussion of the differences and problems encountered in fracturing coal seams see Palmer et al, Paper No. 8993 entitled "Analyses Of Unconventional Behavior Observed During Coalbed Fracturing Treatments", Proceedings of the 1989 Coalbed Methane Symposium, The University Of Alabama, Tuscaloosa, April 1989 and R. G. Jeffrey et al, Paper No. 8992 entitled "Hydraulic Fracturing To Enhance Production Of Methane From Coal Seams", Proceedings Of The 1989 Coalbed Methane Symposium, The University Of Alabama, Tuscaloosa, the disclosures of which are incorporated herein.

Usually, the coalbed methane production process begins by drilling at least one wellbore into the coal seam. The wellbore may initially produce some water or a small amount of gas from the coal matrix. Sustained production is achieved by performing a fracturing operation upon the wellbore. In a typical fracturing process, a pad fluid first is pumped down the wellbore and into the coal-containing formation to initiate and propagate fractures in the formation. The pad fluid is followed with a proppant-ladened slurry that is introduced through the wellbore into the created fractures. The slurry forces the pad further into the created fractures thereby extending the fractures while introducing proppants into the crested fracture to maintain the fracture in an open condition at the conclusion of the treatment.

Even though hydraulic fracturing has been widely used to stimulate the production of methane from coal seams, it has often not produced the degree of stimulation expected or desired. For a discussion of various techniques that have been employed see Palmer et al, Paper No. 9139 entitled "Comparison Between Gel-Fracture and Water-Fracture Stimulations In The Black Warrior Basin", Puri et al, Paper No. 9169 entitled "Damage To Coal Permeability During Hydraulic Fracturing" and Sparks et al, Paper No. 9159 entitled "A Comparison Of Completion Techniques in the Cedar Cove Field, Black Warrior Basin, Alabama", all presented at the Proceedings of the 1991 Coalbed Methane Symposium, The University of Alabama, Tuscaloosa, May 1991, the disclosures of which are incorporated herein by reference.

SUMMARY OF THE INVENTION

The present invention provides a new method for treating or fracturing coal seams to improve the production of a gas therefrom. The treating or fracturing is accomplished by injecting a water-based treating or fracturing fluid including an effective amount of an additive capable of effecting enhanced dewatering. The additive comprises at least one member selected from the group consisting of benzyl coco di-(hydroxyethyl) quaternary amine, p-T-amyl-phenol condensed with formaldehyde and a copolymer comprising from about 80 to about 100% $C_{1-30}$ alkyl methacrylate monomers and from about 0 to about 20% hydrophilic monomers.

BRIEF DESCRIPTION OF THE DRAWINGS

FIG. 1 is a graphical illustration showing the water flow-rate of test columns treated with various quantities of the additive of the present invention in comparison to a control.

DESCRIPTION OF THE PREFERRED EMBODIMENT

In accordance with the present invention, a coal seam is treated with a fluid such as an aqueous fracturing fluid containing a selected additive under conditions designed to enhance the subsequent production of gas from the coal reservoir. The fluid can comprise water, gelled water containing any of the well known polysaccharide viscosifying agents or crosslinked gelled water utilizing borates or other conventional crosslinking agents for the viscosifying agents. The water can also include various other additives such as potassium chloride, stabilizers, surfactants, biocides and the like which do not adversely react with the selected additive to impair its ability to enhance dewatering of the coal. The fluid also may contain nitrogen gas or carbon dioxide whereby foams or emulsions may be created.

The selected additive comprises at least one member selected from the group consisting of benzyl coco di-(hydroxyethyl) quaternary amine, p-T-amyl-phenol condensed with formaldehyde and a copolymer comprising from about 80 to about 100% $C_{1-30}$ alkylmethacrylate monomers and from about 0 to 20% hydrophilic monomers. Most preferably the additive comprises a copolymer comprising from about 90 to about 99.5% 2-ethylhexylacrylate and from about 0.5 to about 10% acrylic acid.

The copolymers are made by the well known technique of emulsion polymerization in which polymerizable monomers are dispersed in a liquid in which they are substantially insoluble and the monomers then are polymerized by addition of a suitable initiator. Methods of producing the copolymer are disclosed for example in U.S. Pat. No. 4,670,501, the entire disclosure of which is incorporated by reference. The $C_{1-30}$ alkylmethacrylate monomers are reacted with any number of hydrophilic monomers. The hydrophilic-monomer may be any monomer that will provide polar oxygen-containing or nitrogen-containing groups. Suitable hydrophilic monomers include dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth) acrylates, unsaturated carboxylic acids such as methacrylic acid or preferably acrylic acid, hydroxyethyl acrylate, acrylamide and the like.

The selected additive is admixed with the treatment fluid in an amount sufficient to enhance dewatering of the coal contacted by the fluid subsequent to the treatment. The active additive generally is present in an amount of from about 0.02 to about 3.0% by weight of treatment fluid. Preferably the active additive is present in an amount of from about 0.10 to about 0.70% by weight of treatment fluid. It is to be understood that larger quantities of the additive may be utilized, however, such use does not significantly enhance subsequent dewatering of the coal.

Surprisingly, it has been found that use of the additive of the present invention substantially reduces fines production from the coal seam upon initiation of fluid production from the coal seam. The additive of the present invention is believed to bind the fines produced during fracturing of the coal seam or during subsequent production to the remainder of the coal in the seam.

In accordance with the present invention, a pad fluid comprising the previously described aqueous fracturing fluid containing the selected additive is introduced into a coal seam through a wellbore communicating with a subterranean coal reservoir at a pressure and rate sufficient to create fractures in the coal seam. After initiation of the fractures in the seam, a propping agent preferably is introduced into the created fractures to maintain the fractures in an open condition at the conclusion of the treatment. The propping agent may comprise substantially any of the conventionally known propping agents, such as sand, ceramic particulates and the like. From an economic standpoint, graded sand is preferred. The propping agent is introduced into the fractures by admixing the propping agent with a quantity of the aqueous fracturing fluid then is pumped down the wellbore and out into the created fractures. Upon completion of the treatment, the pumping is terminated and the created fractures ar permitted to relax and close upon the propping agent within the fractures. Pumping then is initiated through the wellbore or a series of wellbores communicating with the coal seam to recover at least a portion of the treatment fluid and to promote production of gas from the coal seam. The selected additive of the present invention has been found to deposit upon or bind to the coal in the coal seam and promote or assist in the subsequent production of gas from either water-containing or "dry" coal seams. In addition to enhancing return of the treatment fluid from a dry coal seam, the additive facilitates removal of fluid from a water-containing coal seam to promote gas production. It is believed that the additive also minimizes fines migration in the coal seam.

In some instances it has been found desirable to admix a quantity of dimethyloctylamine with the selected additive. The admixture has been found to enhance the performance of the present invention in treating some coals. The amine is admixed with the selected additive in the treatment fluid in an amount of from about 0.04 to about 1.0% by weight of treatment fluid. It is to be understood that larger quantities of the amine may be utilized, however, such use does not further enhance subsequent dewatering of the coal.

To further illustrate the present invention and not by way of limitation, the following examples are provided.

EXAMPLE I

A simple test procedure was utilized to allow relatively rapid screening of additives for use in the method of the present invention. The objective was to identify chemicals that would facilitate removal of water from a coal seam subsequent to a stimulation treatment. The test apparatus consisted of a series of packed columns having a 100 mesh screen (U.S. Sieve Series) at the bottom on which a small quantity of glass wool was placed. A quantity of a sand-coal mixture then was added to the column and tamped. The solids mixture comprised 60 grams 20/40 Ottawa sand and 20 grams Mary Lee coal which was ground and sieved to provide an admixture of 92.5% 60/170 mesh and 7.5% 200/325 mesh particles. Tests were performed by passing water through the test colums. All test slurries consisted of broken borate crosslinked gel containing the additive at a concentration of 2 gal/1000 gal fluid followed by water at a constant hydrostatic head through each column. The broken gel comprised approximately a 35 lb/1000 gal gel made with hydroxypropylguar which was crosslinked with a borate ion source and broken with 5 lb/1000 gal sodium persulfate. The water flow rate was monitored at the indicated intervals and the total flow was determined over 14 hours.

TABLE I

| Test | Additive | Water Flow with Time grams | | | | | | | | Total |
|---|---|---|---|---|---|---|---|---|---|---|
| | | 30 min. | 60 min. | 90 min. | 120 min. | 3 hrs. | 4 hrs. | 5 hrs. | 6 hrs. | 14 hrs |
| 1 | water control no gel no additive | 15.21 | 14.52 | 14.12 | 13.79 | 27.32 | 27.00 | 26.74 | 25.36 | 540.68 |
| 2 | water control gel only | 7.48 | 6.61 | 6.62 | 5.99 | 8.21 | 7.79 | 11.77 | 13.90 | 285.83 |
| 3 | 2-ethylhexyl-acrylate acrylic acid copolymer (38% active) | 12.45 | 12.47 | 8.36 | 6.13 | 16.83 | 24.11 | 24.63 | 24.71 | 512.62 |
| 4 | 2-ethylhexyl-acrylate acrylic acid copolymer (4 gal/1000) | 11.06 | 12.37 | 10.85 | 7.47 | 21.01 | 27.65 | 28.11 | 27.91 | 562.97 |
| 5 | Losurf 0[1] | 6.55 | 6.41 | 7.11 | 7.04 | 9.05 | 7.86 | 11.41 | 14.35 | 303.83 |
| 6 | p-T-amyl-phenol condensate w/formaldehyde (50% active) | 8.52 | 9.48 | 9.94 | 7.90 | 12.67 | 18.73 | 22.40 | 22.07 | 433.3 |
| 7 | 11 N[2] | 6.92 | 6.73 | 7.43 | 7.61 | 11.43 | 11.96 | 17.56 | 18.57 | 361.88 |
| 8 | benzyl coco-di-(hydroxyethyl) quarternary amine (80% active) | 9.12 | 10.10 | 9.48 | 6.85 | 14.35 | 21.45 | 22.02 | 21.54 | 433.58 |
| 9 | Super A-Sol[3] | 8.31 | 8.13 | 8.23 | 6.77 | 9.23 | 11.79 | 16.75 | 17.33 | 345.13 |
| 10 | S-Maz-80[4] | 8.36 | 8.82 | 9.02 | 7.95 | 11.25 | 14.79 | 19.45 | 19.40 | 382.43 |
| 11 | Jordaquat JS-25 SP[4] | 8.40 | 8.05 | 7.65 | 6.90 | 9.34 | 10.21 | 14.58 | 15.47 | 314.97 |
| 12 | Organophyllic clay[5] | 8.49 | 8.44 | 7.68 | 6.78 | 10.02 | 12.96 | 15.35 | 16.49 | 328.62 |

TABLE I-continued

| Test | Additive | 30 min. | 60 min. | 90 min. | Water Flow with Time grams 120 min. | 3 hrs. | 4 hrs. | 5 hrs. | 6 hrs. | Total 14 hrs |
|---|---|---|---|---|---|---|---|---|---|---|
| 13 | Maxon 269-10[4] | 8.47 | 7.35 | 6.53 | 5.85 | 11.35 | 14.73 | 17.85 | 17.93 | 355.00 |

[1] a proprietary product of Halliburton Services, Duncan, OK which includes ethylene glycol monobutylether in admixture with nonylphenol formaldehyde condensate (81% active)
[2] a proprietary product of Halliburton Services, Duncan, OK which includes methylamyl alcohol and a blend on nonionic and cationic surfactants (40% active)
[3] a proprietary product of Welchem, Inc. Houston, TX
[4] a proprietary product of PPG/Mazer, Gurnee, IL
[5] used at 8 lb/1000 gallons of fluid The foregoing results clearly demonstrate the superior efficiency of the compounds of the present invention in comparison to other compounds at facilitating flow of water from coal.

EXAMPLE

Test columns were prepared as in Example I and treated with quantities of a copolymer of 2-ethylhexylacrylate-acrylic acid, benzyl coco di-(hydroxyethyl) quaternary amine and p-T-amyl-phenol condensed with formaldehyde. Water flow through the columns was monitored for 4 hours. The water flow rate through the various columns compared to a control column through which broken gel and no additive was flowed is illustrated in FIG. 1. The results clearly illustrate the beneficial effect resulting from use of the additive of the present invention upon fluid flow.

While that which is considered to be the preferred embodiment of the present invention has been set forth hereinbefore, it is to be understood that changes and modifications can be made to the compositions and method without departing from the spirit or scope of the invention as set forth in the appended claims.

We claim:

1. A method of treating a water-containing coal seam penetrated by a wellbore to enhance dewatering and facilitate gas production comprising:
   introducing a treating fluid through a wellbore into contact with a subterranean coal seam, said treating fluid including an effective amount of an additive comprising at least one member selected from the group consisting of benzyl coco di-(hydroxyethyl) quaternary amine, p-T-amyl-phenol condensed with formaldehyde and a copolymer comprising from about 80 to about 100% $C_{1-30}$ alkylmethacrylate monomers and from about 0 to about 20% hydrophilic monomers, and
   pumping water from said coal seam through said wellbore whereby production of gas is initiated, said flow rate of water from said formation being at a rate in excess of the flow produced under substantially similar pumping conditions in the absence of treatment of said coal with said additive.

2. The method of claim 1 wherein said treatment fluid is a fracturing fluid.

3. The method of claim 1 wherein said additive comprises a copolymer comprising from about 90 to 99.5% ethylhexylacrylate and from about 0.5 to 10% acrylic acid.

4. The method of claim 3 wherein said copolymer is present in an active polymer amount of from about 0.05 to about 3.0% by weight of said treatment fluid.

5. The method of claim 1 wherein said additive comprises a copolymer comprising from about 90 to 99.5% ethylhexylacrylate and from about 0.5 to 10% acrylic acid admixed with a quantity of dimethyloctylamine.

6. The method of claim 1 wherein said individual additive is present in an amount of from about 0.05 to about 3.0% by weight of said treatment fluid.

7. The method of claim 1 wherein a quantity of dimethyloctylamine is admixed with said additive in an amount of from about 0.04 to about 1.0% by weight of said treating fluid.

8. A method for fracturing a coal seam to enhance the production of methane therefrom comprising:
   injecting an aqueous fracturing fluid into a wellbore communicating with a coal seam under certain conditions such that a fracture is created therein, said fracturing fluid including an effective amount of an additive comprising at least one member selected from the group consisting of benzyl coco di-(hydroxyethyl) quaternary amine, p-T-amyl-phenol condensed with formaldehyde and a copolymer comprising from about 80 to about 100% $C_{1-30}$ alkylmethacrylate monomers and from about 0 to about 20% hydrophilic monomers and;
   said additive contacting at least a portion of any coal fines which are formed during fracturing of the coal seam whereby said fines are caused to be retained within the created fracture upon production of fluid therefrom; and
   producing fluid from said created fracture, said fluid including at least a substantial portion of said fracturing fluid initially and subsequently methane.

9. The method of claim 8 wherein at least a portion of said fracturing fluid includes a propping agent.

10. The method of claim 8 wherein said additive comprises a copolymer comprising from about 90 to 99.5% ethylhexylacrylate and from about 0.5 to 10% acrylic acid.

11. The method of claim 10 wherein said copolymer is present in an active polymer amount of from about 0.05 to about 3.0% by weight of said fracturing fluid.

12. The method of claim 10 wherein said additive comprises a copolymer comprising from about 90 to 99.5% ethylhexylacrylate and from about 0.5 to 10% acrylic acid admixed with a quantity of dimethyloctylamine.

13. The method of claim 8 wherein said individual additive is present in an amount of from about 0.05 to about 3.0% by weight of said fracturing fluid.

14. The method of claim 8 wherein a quantity of dimethyloctylamine is admixed with said additive in an amount of from about 0.04 to about 1.0% by weight of said fracturing fluid.

* * * * *